United States Patent Office 3,111,496
Patented Nov. 19, 1963

1

3,111,496

HIGH TEMPERATURE BLOWING OF RUBBER AND PLASTICS WITH ALKALI METAL AZODICARBOXYLATE

Byron A. Hunter, Woodbridge, and Robert R. Barnhart, Naugatuck, Conn., assignors to United States Rubber Company, New York, N.Y., a corporation of New Jersey No Drawing. Filed Nov. 14, 1960, Ser. No. 68,688
5 Claims. (Cl. 260—2.5)

The invention is concerned with a method of producing cellular rubber and plastics. Specifically the invention resides in the discovery that the sodium salt of azodicarboxylic acid is a novel gas forming agent which is useful in the manufacture of expanded rubbers and plastics.

The formation of cellular polymeric materials by heating the polymeric substances in the presence of certain heat sensitive nitrogen compounds is well known. The characteristics of the expanded product will vary markedly with the specific gas forming agent used, and selection of the agent for any particular purpose will depend upon the requirements of the intended application. For example, diazoamino benzene (Cooper, U.S. Patent 2,421,831, June 10, 1947) is a very effective expanding agent for rubber but suffers from the fact that the material is strongly staining and discoloring, and only dark colored cellular rubber or plastic products can be produced when it is used. Freedom from discoloration may be achieved, however, if a nonstaining blowing agent such as dinitroso pentamethylene tetramine (Briggs et al., U.S. Patent 2,491,709, December 20, 1949) is employed. In this case, however, odorous decomposition products are formed during decomposition of the blowing agent, and the unmodified material cannot be used where odor is an objectionable factor. Introduction of urea or biurea into the composition alleviates the odor difficulty to a considerable extent (Walker et al., U.S. 2,754,276, July 10, 1956) but does not entirely remove the problem in certain applications. Employment of azobis(isobutyronitrile) as a blowing agent in a plastic composition (Barton, U.S. Patent 2,484,397, October 11, 1949) affords a light colored, nonodorous product, but unfortunately a toxic residue is formed from the blowing agent which seriously restricts its application. Certain organic sulfonhydrazides are free from odor and discoloration features (Lober et al., U.S. 2,626,933, January 27, 1953, and Schoene, U.S. 2,552,065, May 8, 1951), and these are widely used blowing agents. Even these latter materials are limited in their use to applications involving rather restricted temperature ranges.

An objective of the present invention is to provide a blowing agent which remains undecomposed at temperatures well above the decomposition temperature of sulfonhydrazides and which may be successfully employed in compositions requiring relatively high mixing temperatures and which are subsequently heated to even higher temperatures to expand the material.

A further objective is to provide an effective blowing agent for rubber and plastics which is nondiscoloring, nonodorous, and which does not leave an undesirable toxic residue in the expanded product. We have found that these and other valuable objectives can be achieved by our discovery of the application sodium azodicarboxylate as a blowing agent for rubber and plastics. This substance is stable when stored in a closed container at normal temperatures but decomposes with the formation of large amounts of gas when heated to temperatures in the region of 240° C. (464° F.). This temperature is well above the decomposition temperature of available commercial blowing agents. The high decomposition temperature is a valuable property which enables one to use the agent in the expansion of higher melting plastic materials such as polyethylene, polypropylene, and other polymeric materials which require relatively high temperature mixing conditions for most effective incorporation of the blowing agent and other compounding ingredients.

2

Although the normal decomposition temperature of sodium azodicarboxylate is around 240° C. (464° F.), the material decomposes to gaseous products at temperatures considerably lower than 240° C. in the presence of the compounding ingredients normally employed in the vulcanization of rubber. For example, the blowing agent will decompose at normal curing temperatures (circa 150° C.) (about 300° F.) to give an expanded rubbery product. Typical rubber compounding ingredients which lower the decomposition temperature of the blowing agent include zinc compounds, such as zinc oxide and zinc salts of fatty acids, e.g. zinc laurate. However, where needful, the material to be expanded can be formulated to prevent premature decomposition of the blowing agent, and advantage may be taken of the intrinsic relatively high temperature stability of the agent. Such formulation for high temperature decomposition is accomplished by omitting or reducing zinc compounds or other substances which activate the decomposition. It will thus be seen that sodium azodicarboxylate is an unusually versatile blowing agent which offers possibilities for application in a wide field of use in the production of cellular structures in rubbers and plastics.

The preparation of potassium azodicarboxylate is described by Thiele, Ann., 271, 127 (1892). Preparation of the corresponding sodium salt is referred to by King, J. Am. Chem. Soc., 62, 379 (1940), using Thiele's method.

Included in the materials which are expanded with the blowing agent of our invention are natural and synthetic rubbers including various polydienes such as polyisoprene, polybutadiene as well as diene-vinyl compound copolymers such as butadiene-styrene copolymer, butadiene-acrylonitrile copolymer, isoprene-isobutylene copolymer (butyl rubber), etc. Other polymeric materials that can be used include polyethylene, polypropylene, ethylene-propylene copolymer, polyvinyl chloride, polyvinyl acetate, polyamides (nylon types), polystyrene, cellulose acetate, polyurethanes, polycarbonates, etc.

The present blowing process is applicable to any of the usual organoplastic materials which can be expanded by heat-decomposable chemical blowing agents. Such organoplastics are capable of setting to a normally solid state and they have sufficient consistency and tensile strength under the conditions of the expansion step (e.g. temperatures of around 300–400° F.) to retain the evolved expanding gas and the resulting expanded structure. These organoplastic materials include the rubbers (natural and synthetic), thermosetting resins, and thermoplastic resins (including the plastisols which are gelled and fused by heat), and they may be described as moldable, plastic high polymeric materials or macromolecules, whether rubbery or non-rubbery. Such organoplastic materials are described in more detail in the prior patents on blowing agents, for example, U.S. Patent 2,634,243 issued to Glenn on April 7, 1953.

The following examples, in which all quantities are expressed on a weight basis, will serve to illustrate the practice of the invention in more detail.

*Example I*

A synthetic rubber composition (referred to as the

"masterbatch") was prepared in accordance with the following recipe:

| | Parts by weight |
|---|---|
| Butadiene-styrene copolymer rubber (23% styrene) ("Synpol" 1006) | 100.0 |
| p,p-Dioctyl diphenylamine (Octamine) | 1.0 |
| High-styrene (85% styrene–15% butadiene) semi-reinforcing resin (Kralac A-EP) | 20.0 |
| Finely divided wood cellulose (Solka Floc) | 10.0 |
| Cumarone-indene resin (Cumar MH 2½) | 6.0 |
| Zinc oxide (Protox 268) | 5.0 |
| Stearic acid | 3.0 |
| Precipitated calcium silicate (Silene EF) | 25.0 |
| Titanium oxide (Titanox AMO) | 5.0 |
| Hard clay (Suprex Clay) | 60.0 |
| Light processing oil (Circo Light Oil): API gravity—21.6; aniline point—154 (petroleum hydrocarbon oil | 10.0 |
| Petrolatum | 4.0 |
| | 249.0 |

To separate portions of the above masterbatch were added curvatives and blowing agents in accordance with the following:

| | A | B | C |
|---|---|---|---|
| Masterbatch | 249.0 | 249.0 | 249.0 |
| Sodium azodicarboxylate | 7.0 | 7.0 | 3.5 |
| Bis (benzothiazyl) disulfide (MBTS) | 1.25 | 1.25 | 1.25 |
| Tetra methyl thiuram monosulfide (Monex) | 0.3 | 0.3 | 0.3 |
| Diphenyl guanidine (DPG) | 0.3 | 0.3 | 0.3 |
| Stearic acid | | 4.0 | |
| Sulfur | 3.0 | 3.0 | 3.0 |

Each of the compositions were mixed on a 150° F. mill for a uniform time and were then cured in a closed mold for ten minutes at 340° F.

The densities of the resulting expanded samples are indicated:

| | A | B | C |
|---|---|---|---|
| Denisity of cured stock (lbs. per cu. ft.) | 32.7 | 29.9 | 33.1 |

The product in each case was a well expanded rubber product exhibiting a fine uniform cell structure.

*Example II*

Rubbery compositions were prepared from the following ingredients:

| | A | B |
|---|---|---|
| Isobutylene-isoprene copolymer rubber (2 to 2.5 mole-percent unsaturation) (Butyl 365) | 100.0 | 100.0 |
| Zinc oxide (Protox 166) | 5.0 | 5.0 |
| Stearic acid | 1.0 | 1.0 |
| Petrolatum | 3.0 | 3.0 |
| Wax blend (Sunproof) | 5.0 | 5.0 |
| Carbon black (Pelletex) | 60.0 | 60.0 |
| Light processing oil (Necton 60) | 20.0 | 20.0 |
| Sodium azodicarboxylate | 5.0 | 5.0 |
| p-tert. butylphenol $CH_2O$ resin (Super Beckacite 1001) | 8.0 | |
| Stannous chloride dihydrate | 1.6 | |
| Sulfur | | 1.0 |
| Zinc benzothiazole mercaptide (Oxaf) | | 1.0 |
| Tetramethyl thiuram disulfide (Tuex) | | 2.0 |

Each of the stocks were cured for 30 minutes at 324° F.

| | | |
|---|---|---|
| Density of cured stock (lbs./per cu. ft.) | 54.9 | 47.6 |

In each case a well expanded rubber product was obtained.

*Example III*

A vinyl plastisol composition of the following description was made up:

| | |
|---|---|
| Polyvinyl chloride resin (Marvinol VR–50) | 160.0 |
| Dioctyl phthalate (DOP) | 150.0 |
| Monohydrous lead sulfate (tribasic) | 35.0 |
| Dibasic lead phthalate (Dythal) | 35.0 |
| Calcium sulfonate (Demivis) | 6.6 |

To a 100-gram portion of the above mix was added 10 grams of sodium azodicarboxylate. The composition was well mixed using a high speed stirrer and then a portion poured into both halves of a spherical mold (¾" diameter). The mold was placed in a press and cured for 20 minutes at 400° F. and under 20,000 pounds' ram pressure. The mold was then cooled to room temperature (still under pressure); and after releasing the pressure, the mold was opened and the slightly expanded ball removed from the mold. The vinyl ball was then placed in boiling water for 30 minutes, whereupon it gradually expanded to form a cellular sphere. When cool the ball was weighed and the volume determined by water displacement.

Weight=4.0 grams
Volume=14.0 cc.
Density=4.0/14=0.285 g./cc.

The density of a similarly prepared ball without the blowing agent (vol.=3.5 cc.) was 1.1 g./cc. The ratio of density of the expanded ball to the unexpanded without blowing agent was 0.26 to 1.0.

Although the invention has been described in detail with reference to the use of sodium azodicarboxylate as the blowing agent, it will be understood that any alkali metal azodicarboxylate may be substituted for the sodium azodicarboxylate, such as potassium or lithium azodicarboxylate.

Having thus described our invention, what we claim and desire to protect by Letters Patent is:

1. A method of making a gas-expanded organoplastic material which comprises mixing an alkali metal azodicarboxylate as a blowing agent with an expandable organoplastic material which is capable of setting to a normally solid state and having sufficient consistency and tensile strength under the conditions of the aforementioned decomposing step to retain the evolved expanding gas and the resulting expanded structure, subsequently decomposing said alkali metal azodicarboxylate by heating to a temperature of at least 300° F. to evolve gas, causing said evolved gas to be retained in and to expand said organoplastic material, and causing said organoplastic material to set and retain its expanded condition.

2. A method as in claim 1 wherein the said alkali metal azodicarboxylate is sodium azodicarboxylate.

3. A method as in claim 2 wherein the said organoplastic material is a rubber.

4. A method as in claim 2 wherein the said organoplastic material is a thermoplastic resin.

5. A method as in claim 2 wherein the said organoplastic material is a plastisol.

References Cited in the file of this patent

UNITED STATES PATENTS

| | | |
|---|---|---|
| 2,828,299 | Von Glahn et al. | Mar. 25, 1958 |
| 2,873,481 | Semegen | Feb. 17, 1959 |
| 2,930,769 | Haggis et al. | Mar. 29, 1960 |

FOREIGN PATENTS

| | | |
|---|---|---|
| 719,102 | Great Britain | Nov. 24, 1954 |

OTHER REFERENCES

King: J. Am. Chem. Soc., 62, 379 (1940).

Plastics Progress, 1955, Iliffe and Sons Ltd., London, page 53.